(12) United States Patent
Reker et al.

(10) Patent No.: US 12,275,095 B2
(45) Date of Patent: Apr. 15, 2025

(54) BRAZE ALLOY MIX FOR APPLICATION IN A METHOD FOR BRAZING A COMPONENT, ADDITIVE ALLOY, BRAZING METHOD, AND COMPONENT

(71) Applicant: MTU Aero Engines AG, Munich (DE)

(72) Inventors: Dirk Wilhelm Reker, Hannover (DE); Roman Sowa, Gniewczyna (PL)

(73) Assignee: MTU Aero Engines AG, Munich (DE)

( * ) Notice: Subject to any disclaimer, the term of this patent is extended or adjusted under 35 U.S.C. 154(b) by 27 days.

(21) Appl. No.: 18/319,384

(22) Filed: May 17, 2023

(65) Prior Publication Data
US 2024/0058901 A1 Feb. 22, 2024

(30) Foreign Application Priority Data
May 20, 2022 (EP) .................................. 22174597

(51) Int. Cl.
*B23K 35/30* (2006.01)
*B23K 1/00* (2006.01)
*B23K 35/02* (2006.01)
*C22C 19/05* (2006.01)
*C22C 19/07* (2006.01)

(52) U.S. Cl.
CPC ........ *B23K 35/3033* (2013.01); *B23K 1/0008* (2013.01); *B23K 35/0244* (2013.01); *C22C 19/056* (2013.01); *C22C 19/07* (2013.01)

(58) Field of Classification Search
USPC ....................................................... 420/438
See application file for complete search history.

(56) References Cited

U.S. PATENT DOCUMENTS

| | | | |
|---|---|---|---|
| 3,759,692 A | 9/1973 | Zelahy | |
| 4,830,934 A | 5/1989 | Ferrigno et al. | |
| 5,156,321 A | 10/1992 | Liburdi et al. | |
| 5,240,491 A * | 8/1993 | Budinger | B23K 35/3033 428/668 |
| 5,916,518 A * | 6/1999 | Chesnes | B23K 35/0244 420/439 |
| 6,165,290 A * | 12/2000 | Rabinkin | C22C 45/04 148/403 |
| 6,454,885 B1 * | 9/2002 | Chesnes | B23K 1/0018 148/528 |
| 6,508,000 B2 | 1/2003 | Burke et al. | |
| 7,156,280 B1 * | 1/2007 | Jiang | C22C 19/055 428/668 |
| 7,279,229 B2 * | 10/2007 | Budinger | C22C 19/058 228/248.1 |
| 7,887,748 B2 | 2/2011 | Volek | |
| 8,075,662 B2 * | 12/2011 | Minor | B23K 35/304 75/254 |
| 8,734,716 B2 * | 5/2014 | Harada | C22C 19/055 420/446 |
| 9,346,131 B2 | 5/2016 | Waltemathe et al. | |
| 10,549,372 B2 | 2/2020 | Kumar et al. | |
| 2009/0159645 A1 * | 6/2009 | Cretegny | C22C 19/07 420/451 |
| 2021/0323056 A1 | 10/2021 | Burbaum et al. | |

FOREIGN PATENT DOCUMENTS

| | | |
|---|---|---|
| CN | 105149597 B | 9/2018 |
| DE | 102010036630 B4 | 7/2020 |
| EP | 1258545 B1 | 12/2004 |
| EP | 1957685 B1 | 9/2014 |
| EP | 2969380 B1 | 5/2020 |
| EP | 3689610 A1 * | 8/2020 |

* cited by examiner

*Primary Examiner* — Devang R Patel
(74) *Attorney, Agent, or Firm* — Hinckley, Allen & Snyder, LLP; David Josephs

(57) ABSTRACT

The invention relates to a braze alloy mix for application in a method for brazing a component that has a nickel-based superalloy as base material, wherein the braze alloy mix comprises the following powders in a predetermined mixing ratio: a powder of a first braze alloy, a powder of a second braze alloy, a powder of a third braze alloy, and a powder of an additive alloy.

12 Claims, 2 Drawing Sheets

BRAZE ALLOY MIX FOR APPLICATION IN A METHOD FOR BRAZING A COMPONENT, ADDITIVE ALLOY, BRAZING METHOD, AND COMPONENT

BACKGROUND OF THE INVENTION

The invention relates to a braze alloy mix for application in a method for brazing a component according to the present invention, an additive alloy for a braze alloy mix according to the present invention, a brazing method for brazing a component according to the present invention, as well as a component for a turbomachine according to the features of the present invention.

In repairing polycrystalline and monocrystalline high-pressure turbine components, it is necessary to avoid an undesirable influencing of the metallurgical structure of the high-pressure turbine component. For this reason, for example, welding methods based on a hot crack sensitivity of precipitation-hardened nickel-based superalloys cannot be employed. Instead of this, brazing methods are applied for repairing high-pressure turbine components. In brazing methods for repair, a braze based on nickel and/or cobalt is used in the process of high-temperature brazing under vacuum. The brazes used have an alloy chemistry that is similar to the base material of the component on which the braze is applied. In order to reduce the temperature required for melting the braze, so-called melting point reducers are usually added as alloying elements. Reducing the temperature is particularly required in order to prevent damage to the metallurgical structure of a base material of the component to be brazed.

Melting point reducers usually involve boron or silicon. In the process of temperature brazing, temperatures of 1100° C. to 1300° C., usually 1150° C. to 1250° C. and holding times from minutes up to many hours are employed. In this case, the braze should solidify isothermally at the brazing site. This results from the fact that the braze is maintained at a predetermined temperature, so that the melting point reducer can diffuse from the braze into the base material. Based on the decrease in the concentration of the melting point reducer in the braze, the melting point of the braze increases, so that the braze can solidify at constant temperature.

In the case of larger cracks, it is necessary to add an additive alloy, which fulfills multiple functions, to the braze. The additive alloy is provided, among other things, to act as a diffusion sink and thereby to take up the melting point reducer. The additive alloy is provided for filling gaps for reducing the effective boron concentration. The additive alloy thereby functions as a filler in the case of large gap widths, whereupon the quantity of the braze to be used and thus also of the "boron" melting point reducer are reduced.

The additive alloy is also incorporated for a material structure. This is necessary in the case of large gap widths above 300 μm to 500 μm, since at these gap widths, the surface tension of molten metals (braze) is insufficient for filling the gap. The result of too small a surface tension would be a run-out of the braze, whereby filling errors would arise, which again would negatively affect the properties of a braze connection. Due to the additive alloy, capillaries form between particles, and these capillaries reduce the loss of the braze, and the braze stays at the site of the braze application. This function is particularly important in the case of building up wall thickness, since in this case, any gap is not brazed and a capillary effect cannot be introduced due to the component geometry.

In the case of larger cracks, it is not economically implementable to conduct the diffusion process long enough to diffuse the melting point reducer sufficiently in the base material. Melting point reducers may thereby introduce brittle phases in the braze. A further disadvantage in the current method is the fact that the melting point reducer is diffused in the base material after an initial repair. In the case of a second repair, the base material is already enriched with the temperature reducer, so that a concentration gradient does not exist. In the case of the second temperature, the melting point reducer therefore cannot diffuse from the braze into the base material.

A brazing method and a brazing material for the repair of a component is known from DE 10 2010 036 630 B4. In said method, it is provided to introduce at least one first brazing paste onto a gap in the component. The brazing paste here is a powder made up of a first and a second alloy and an added organic binding agent. In this case, the first alloy has a higher melting point than the second alloy.

U.S. Pat. No. 10,549,372 B2 describes a brazing alloy composition, which has 5 to 25 wt. % germanium and 1 to 4 wt. % boron.

CN 105149597 B describes a method for repairing or connecting metal or alloy parts. It proposes to use a filler powder, wherein the filler powder contains 8-35 wt. % Cr, 0-15 wt. % W, 0-15 wt. % Mo, 0-10 wt. % Ta, 0-6 wt. % Nb, 2-8 wt. % Al, 0-6 wt. % Ti, 0-5 wt. % Hf, 0-1 wt. % Y, with the remainder being Ni and impurities.

EP 1 957 685 B1 discloses a method for repairing cracks in components made of a superalloy by means of brazing. The superalloy has the following composition: 2 to 16 wt. % Cr; 0 to 15 wt. % Co; 0 to 3 wt. % Mo; 0 to 10 wt. % W; 0 to 12 wt. % Ta; 0 to 6 wt. % Re; 0 to 1 wt. % V; 0 to 0.5 wt. % Nb; 0.05 to 6.5 wt. % Al; 0 to 5 wt. % Ti; 0 to 0.2 wt. % Hf; 0 to 0.07 wt. % C; remainder Ni. A brazing material is an alloy with the same alloy elements as the alloy of the component.

EP 1 258 545 B1 describes a method for isothermal brazing of monocrystalline articles.

U.S. Pat. No. 6,508,000 B2 discloses a method for repairing turbine blades and turbine guide vanes by liquid-phase bonding.

U.S. Pat. No. 5,156,321 A discloses a powder-metallurgy repair method. A metal powder for the repair method comprises a superalloy, comprising 8-35 wt. % Cr, 0-15 wt. % W, 0-15% Mo, 0-10% Ta, 0-6% Nb, 0-6% Al, 0-6% Ti, 0-5% Hf, 0-1% Y, 50-80% Ni, and/or Co, and/or Fe.

For repair brazing of monocrystalline and polycrystalline high-pressure turbine components, for example, vanes, shrouds, etc., brazes based on nickel and/or cobalt are used in the process of high-temperature brazing under vacuum. Fields of application are the repair of cracks, build-up of wall thickness, and geometric regeneration, such as, e.g., the restoration of geometries of cooling air bores. Welding methods cannot be used at the present time, based on the hot crack sensitivity of precipitation-hardened nickel-based superalloys.

The brazes being used usually have an alloy chemistry that is similar to the base material G. In order to reduce the melting point of the alloys, boron-usually 2.3-3.5 mass %—or silicon is additionally alloyed to the braze. Alternative melting point reducers that are seldom applied or technology still found in the research and development stage are, for example, germanium, in rare cases also titanium, hafnium, zirconium, palladium, or manganese.

In the process of repair brazing, temperatures T from 1100° C.-1300° C., usually 1150° C.-1250° C., and holding times t from minutes up to many hours, 3-48 h, are employed. With high temperatures T, the melting point reducer element should diffuse from the braze into the basic material G, whereby the braze has a decreased amount of melting point reducer, and thus may solidify at constant temperature T in an isothermal solidification process.

Brazes are usually applied as pastes onto the regions to be repaired. In the case of brazing large gap widths, a high-melting component, which is the same or similar in its composition to the base material G, is mixed in. A known method is activated diffusion healing, ADH, GE, in which a braze constituent D-15 and a high-melting component or also the additive named Rene 80 will be mixed in. Usual mixing ratios between braze and additive are 30/70, 40/60, 50/50, 60/40. The additive functions as a diffusion sink and takes care that the braze does not run off in the case of large gap widths. The process with use of an additive is similar to liquid-phase sintering.

Since cracks having large distances between crack flanks and therefore large gap widths are brazed in the case of repair brazing, a large amount of braze must be applied in order to fill a crack. The melting point reducers necessary for the process are thereby also present in a large amount, for which reason they cannot sufficiently diffuse into the base material G within economical processing times t and thus give rise to brittle phases. Brittle phases are undesirable phases that typically occur with the use of the particular melting point reducer at high concentrations. For example, boron forms various borides, usually chromium bromides CrB, Cr2B, CrB2, M5B3, M3B2, wherein M stands for different metals, usually chromium, molybdenum, tungsten. Titanium forms an η phase. Germanium forms a too-stable γ' phase, which solidifies for the most part and thus a "hem" is present. Niobium forms a Laves phase. One type of Laves phase in this case is dependent on other alloy elements.

In addition to activated diffusion healing, another method is partitioned alloy component healing, PACH, GE. In the case of partitioned alloy component healing, different brazes are named for brazing nickel-based and cobalt-based alloys.

A complete isothermal solidification of the braze leads to a braze metallurgical structure that is devoid of brittle phases. This is not adjusted based on limited holding times t at high temperatures T and based on large braze gap widths in repair brazing. Brittle phases that reduce strength and are thus undesirable can only be prevented or reduced, with high temperatures T and very long holding times, for example, of up to 48-72 hours. When brittle phases must be prevented, the process times t at high temperatures T are not only uneconomical, but bring about damage of the base material G, due to the long holding times t at high temperatures T.

Also, a conventional brazing repair based on randomly occurring crack widths is not reproducible, so that it cannot be repeated after a first repair with identical characteristics. After the first repair, since the base material G is already enriched with the melting-point-reducing element, there is no concentration gradient present for a new repair. A repair of parts that does not adversely affect the service life is thus possible only to a limited extent.

SUMMARY OF THE INVENTION

An object of the invention is to make possible a brazing of a component made of a nickel-based superalloy without a formation of brittle phases, i.e., TCP (topologically close packed phases, GCP (geometrically close packed phases), eutectic borides (script like phase). A further object of the invention consists in making possible the reproducibility of the braze in case of a repeated repair of the component.

The object is achieved according to the invention by a braze alloy mix for application in a method for brazing a component according to the present invention, an additive alloy for a braze alloy mix according to the present invention, a brazing method for brazing a component according to the present invention, as well as a component for a turbomachine according to the present invention. Advantageous embodiments with appropriate enhancements of the invention are discussed in detail below, wherein advantageous embodiments of each aspect of the invention are to be viewed as advantageous embodiments of each of the other aspects of the invention.

A first aspect of the invention relates to a braze alloy mix for application in a method for brazing a component, this mix having a nickel-based superalloy and/or a cobalt-based alloy as base material. In other words, the first aspect of the invention relates to a braze alloy mix provided for the repair brazing of a component made of a nickel-based superalloy. Here, the braze alloy mix comprises powders that are mixed in a predetermined mixing ratio. The powder of the braze alloy mix comprises a powder of a first braze alloy, a powder of a second braze alloy, a powder of a third braze alloy, and a powder of an additive alloy. The first braze alloy, the second braze alloy, and the third braze alloy can be so-called high-temperature brazes. The additive alloy, among other things, can be provided for the purpose of taking up melting point reducers of the braze alloys during a diffusion process and fulfilling the further additive-specific tasks, which are described in the introduction. In this way, the additive alloy also functions as a diffusion sink, so that a portion of the melting point reducer diffusing into the base material can be reduced.

An alloy composition of the first braze alloy comprises the following in mass percent: between 5.00% and 15.00% cobalt, between 8.00% and 16.00% chromium, between 1.00% and 4.50% aluminum, between 0.00% and 4.00% tantalum, between 0.00% and 10.00% germanium, between 1.00% and 3.00% boron, between 0.00% and 4.00% hafnium, and nickel as well as unavoidable impurities as the remainder. The first braze alloy can comprise, for example, 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00%, 7.10%, 7.20%, 7.30%, 7.40%, 7.50%, 7.60%, 7.70%, 7.80%, 7.90%, 8.00%, 8.10%, 8.20%, 8.30%, 8.40%, 8.50%, 8.60%, 8.70%, 8.80%, 8.90%, 9.00%, 9.10%, 9.20%, 9.30%, 9.40%, 9.50%, 9.60%, 9.70%, 9.80%, 9.90%, 10.00%, 10.10%, 10.20%, 10.30%, 10.40%, 10.50%, 10.60%, 10.70%, 10.80%, 10.90%, 11.00%, 11.10%, 11.20%, 11.30%, 11.40%, 11.50%, 11.60%, 11.70%, 11.80%, 11.90%, 12.00%, 12.10%, 12.20%, 12.30%, 12.40%, 12.50%, 12.60%, 12.70%, 12.80%, 12.90%, 13.00%, 13.10%, 13.20%, 13.30%, 13.40%, 13.50%, 13.60%, 13.70%, 13.80%, 13.90%, 14.00%, 14.10%, 14.20%, 14.30%, 14.40%, 14.50%, 14.60%, 14.70%, 14.80%, 14.90%, 15.00% cobalt; 8.00%, 8.10%, 8.20%, 8.30%, 8.40%, 8.50%, 8.60%, 8.70%, 8.80%, 8.90%, 9.00%, 9.10%, 9.20%, 9.30%, 9.40%, 9.50%, 9.60%, 9.70%, 9.80%, 9.90%, 10.00%, 10.10%, 10.20%, 10.30%, 10.40%, 10.50%, 10.60%, 10.70%, 10.80%, 10.90%, 11.00%, 11.10%, 11.20%, 11.30%, 11.40%, 11.50%, 11.60%, 11.70%, 11.80%, 11.90%, 12.00%, 12.10%, 12.20%, 12.30%, 12.40%, 12.50%, 12.60%, 12.70%, 12.80%, 12.90%, 13.00%, 13.10%, 13.20%, 13.30%, 13.40%, 13.50%, 13.60%, 13.70%, 13.80%, 13.90%, 14.00%, 14.10%, 14.20%, 14.30%, 14.40%, 14.50%, 14.60%, 14.70%, 14.80%, 14.90%, 15.00%, 15.10%, 15.20%, 15.30%, 15.40%, 15.50%, 15.60%, 15.70%, 15.80%, 15.90%, 16.00% chromium; 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00%, 3.10%, 3.20%, 3.30%, 3.40%, 3.50%, 3.60%, 3.70%, 3.80%, 3.90%, 4.00%, 4.10%, 4.20%, 4.30%, 4.40%, 4.50% aluminum; 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00%, 3.10%, 3.20%, 3.30%, 3.40%, 3.50%, 3.60%, 3.70%, 3.80%, 3.90%, 4.00% tantalum; 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00%, 3.10%, 3.20%, 3.30%, 3.40%, 3.50%, 3.60%, 3.70%, 3.80%, 3.90%, 4.00%, 4.10%, 4.20%, 4.30%, 4.40%, 4.50%, 4.60%, 4.70%, 4.80%, 4.90%, 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00%, 7.10%, 7.20%, 7.30%, 7.40%, 7.50%, 7.60%, 7.70%, 7.80%, 7.90%, 8.00%, 8.10%, 8.20%, 8.30%, 8.40%, 8.50%, 8.60%, 8.70%, 8.80%, 8.90%, 9.00%, 9.10%, 9.20%, 9.30%, 9.40%, 9.50%, 9.60%, 9.70%, 9.80%, 9.90%, 10.00% germanium; 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00% boron; 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00%, 3.10%, 3.20%, 3.30%, 3.40%, 3.50%, 3.60%, 3.70%, 3.80%, 3.90%, 4.00% hafnium; and nickel and impurities as the remainder.

An alloy composition of the second braze alloy comprises the following in mass percent: between 15.00% and 25.00% chromium; between 8.50% and 13.00% titanium; between 0.00% and 5.00% niobium; and cobalt as well as unavoidable impurities as the remainder. The second braze alloy can comprise, for example, 15.00%, 15.10%, 15.20%, 15.30%, 15.40%, 15.50%, 15.60%, 15.70%, 15.80%, 15.90%, 16.00%, 16.10%, 16.20%, 16.30%, 16.40%, 16.50%, 16.60%, 16.70%, 16.80%, 16.90%, 17.00%, 17.10%, 17.20%, 17.30%, 17.40%, 17.50%, 17.60%, 17.70%, 17.80%, 17.90%, 18.00%, 18.10%, 18.20%, 18.30%, 18.40%, 18.50%, 18.60%, 18.70%, 18.80%, 18.90%, 19.00%, 19.10%, 19.20%, 19.30%, 19.40%, 19.50%, 19.60%, 19.70%, 19.80%, 19.90%, 20.00%, 20.10%, 20.20%, 20.30%, 20.40%, 20.50%, 20.60%, 20.70%, 20.80%, 20.90%, 21.00%, 21.10%, 21.20%, 21.30%, 21.40%, 21.50%, 21.60%, 21.70%, 21.80%, 21.90%, 22.00%, 22.10%, 22.20%, 22.30%, 22.40%, 22.50%, 22.60%, 22.70%, 22.80%, 22.90%, 23.00%, 23.10%, 23.20%, 23.30%, 23.40%, 23.50%, 23.60%, 23.70%, 23.80%, 23.90%, 24.00%, 24.10%, 24.20%, 24.30%, 24.40%, 24.50%, 24.60%, 24.70%, 24.80%, 24.90%, 25.00% chromium; 8.50%, 8.60%, 8.70%, 8.80%, 8.90%, 9.00%, 9.10%, 9.20%, 9.30%, 9.40%, 9.50%, 9.60%, 9.70%, 9.80%, 9.90%, 10.00%, 10.10%, 10.20%, 10.30%, 10.40%, 10.50%, 10.60%, 10.70%, 10.80%, 10.90%, 11.00%, 11.10%, 11.20%, 11.30%, 11.40%, 11.50%, 11.60%, 11.70%, 11.80%, 11.90%, 12.00%, 12.10%, 12.20%, 12.30%, 12.40%, 12.50%, 12.60%, 12.70%, 12.80%, 12.90%, 13.00% titanium; 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00%, 3.10%, 3.20%, 3.30%, 3.40%, 3.50%, 3.60%, 3.70%, 3.80%, 3.90%, 4.00%, 4.10%, 4.20%, 4.30%, 4.40%, 4.50%, 4.60%, 4.70%, 4.80%, 4.90%, 5.00% niobium; and cobalt and impurities as the remainder.

An alloy composition of the third braze alloy comprises the following in mass percent: between 0.00% and 10.00% cobalt; between 18.00% and 30.00% chromium; between 10.00% and 14.50% titanium; between 0.00% and 1.80% niobium; and nickel as well as unavoidable impurities as the remainder.

The third braze alloy can comprise, for example, 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00%, 3.10%, 3.20%, 3.30%, 3.40%, 3.50%, 3.60%, 3.70%, 3.80%, 3.90%, 4.00%, 4.10%, 4.20%, 4.30%, 4.40%, 4.50%, 4.60%, 4.70%, 4.80%, 4.90%, 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00%, 7.10%, 7.20%, 7.30%, 7.40%, 7.50%, 7.60%, 7.70%, 7.80%, 7.90%, 8.00%, 8.10%, 8.20%, 8.30%, 8.40%, 8.50%, 8.60%, 8.70%, 8.80%, 8.90%, 9.00%, 9.10%, 9.20%, 9.30%, 9.40%, 9.50%, 9.60%, 9.70%, 9.80%, 9.90%, 10.00% cobalt; 18.00%, 18.10%, 18.20%, 18.30%, 18.40%, 18.50%, 18.60%, 18.70%, 18.80%, 18.90%, 19.00%, 19.10%, 19.20%, 19.30%, 19.40%, 19.50%, 19.60%, 19.70%, 19.80%, 19.90%, 20.00%, 20.10%, 20.20%, 20.30%, 20.40%, 20.50%, 20.60%, 20.70%, 20.80%, 20.90%, 21.00%, 21.10%, 21.20%, 21.30%, 21.40%, 21.50%, 21.60%, 21.70%, 21.80%, 21.90%, 22.00%, 22.10%, 22.20%, 22.30%, 22.40%, 22.50%, 22.60%, 22.70%, 22.80%, 22.90%, 23.00%, 23.10%, 23.20%, 23.30%, 23.40%, 23.50%, 23.60%, 23.70%, 23.80%, 23.90%, 24.00%, 24.10%, 24.20%, 24.30%, 24.40%, 24.50%, 24.60%, 24.70%, 24.80%, 24.90%, 25.00%, 25.10%, 25.20%, 25.30%, 25.40%, 25.50%, 25.60%, 25.70%, 25.80%, 25.90%, 26.00%, 26.10%, 26.20%, 26.30%, 26.40%, 26.50%, 26.60%, 26.70%, 26.80%, 26.90%, 27.00%, 27.10%, 27.20%, 27.30%, 27.40%, 27.50%, 27.60%, 27.70%, 27.80%, 27.90%, 28.00%, 28.10%, 28.20%, 28.30%, 28.40%, 28.50%, 28.60%, 28.70%, 28.80%, 28.90%, 29.00%, 29.10%, 29.20%, 29.30%, 29.40%, 29.50%, 29.60%, 29.70%, 29.80%, 29.90%, 30.00% chromium; 10.00%, 10.10%, 10.20%, 10.30%, 10.40%, 10.50%, 10.60%, 10.70%, 10.80%, 10.90%, 11.00%, 11.10%, 11.20%, 11.30%, 11.40%, 11.50%, 11.60%, 11.70%, 11.80%, 11.90%, 12.00%, 12.10%, 12.20%, 12.30%, 12.40%, 12.50%, 12.60%, 12.70%, 12.80%, 12.90%, 13.00%, 13.10%, 13.20%, 13.30%, 13.40%, 13.50%, 13.60%, 13.70%, 13.80%, 13.90%, 14.00%, 14.10%, 14.20%, 14.30%, 14.40%, 14.50% titanium; 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70% niobium; and nickel and impurities as the remainder.

An alloy composition of the additive alloy comprises the following in mass percent: between 0.00% and 10.00% cobalt; between 10.00% and 18.00% chromium; between 4.00% and 7.00% aluminum; between 4.00% and 7.00% tantalum; between 0.00% and 3.00% molybdenum; between 5.00% and 14.00% tungsten; between 0.00% and 0.6% yttrium; between 0.00% and 2.00% hafnium; and nickel as well as unavoidable impurities as the remainder.

The additive alloy can comprise, for example, 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00%, 3.10%, 3.20%, 3.30%, 3.40%, 3.50%, 3.60%, 3.70%, 3.80%, 3.90%, 4.00%, 4.10%, 4.20%, 4.30%, 4.40%, 4.50%, 4.60%, 4.70%, 4.80%, 4.90%, 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00%, 7.10%, 7.20%, 7.30%, 7.40%, 7.50%, 7.60%, 7.70%, 7.80%, 7.90%, 8.00%, 8.10%, 8.20%, 8.30%, 8.40%, 8.50%, 8.60%, 8.70%, 8.80%, 8.90%, 9.00%, 9.10%, 9.20%, 9.30%, 9.40%, 9.50%, 9.60%, 9.70%, 9.80%, 9.90%, 10.00% cobalt; 10.00%, 10.10%, 10.20%, 10.30%, 10.40%, 10.50%, 10.60%, 10.70%, 10.80%, 10.90%, 11.00%, 11.10%, 11.20%, 11.30%, 11.40%, 11.50%, 11.60%, 11.70%, 11.80%, 11.90%, 12.00%, 12.10%, 12.20%, 12.30%, 12.40%, 12.50%, 12.60%, 12.70%, 12.80%, 12.90%, 13.00%, 13.10%, 13.20%, 13.30%, 13.40%, 13.50%, 13.60%, 13.70%, 13.80%, 13.90%, 14.00%, 14.10%, 14.20%, 14.30%, 14.40%, 14.50%, 14.60%, 14.70%, 14.80%, 14.90%, 15.00%, 15.10%, 15.20%, 15.30%, 15.40%, 15.50%, 15.60%, 15.70%, 15.80%, 15.90%, 16.00%, 16.10%, 16.20%, 16.30%, 16.40%, 16.50%, 16.60%, 16.70%, 16.80%, 16.90%, 17.00%, 17.10%, 17.20%, 17.30%, 17.40%, 17.50%, 17.60%, 17.70%, 17.80%, 17.90%, 18.00% chromium; 4.00%, 4.10%, 4.20%, 4.30%, 4.40%, 4.50%, 4.60%, 4.70%, 4.80%, 4.90%, 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00% aluminum; 4.00%, 4.10%, 4.20%, 4.30%, 4.40%, 4.50%, 4.60%, 4.70%, 4.80%, 4.90%, 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00% tantalum; 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00% molybdenum; 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00%, 7.10%, 7.20%, 7.30%, 7.40%, 7.50%, 7.60%, 7.70%, 7.80%, 7.90%, 8.00%, 8.10%, 8.20%, 8.30%, 8.40%, 8.50%, 8.60%, 8.70%, 8.80%, 8.90%, 9.00%, 9.10%, 9.20%, 9.30%, 9.40%, 9.50%, 9.60%, 9.70%, 9.80%, 9.90%, 10.00%, 10.10%, 10.20%, 10.30%, 10.40%, 10.50%, 10.60%, 10.70%, 10.80%, 10.90%, 11.00%, 11.10%, 11.20%, 11.30%, 11.40%, 11.50%, 11.60%, 11.70%, 11.80%, 11.90%, 12.00%, 12.10%, 12.20%, 12.30%, 12.40%, 12.50%, 12.60%, 12.70%, 12.80%, 12.90%, 13.00%, 13.10%, 13.20%, 13.30%, 13.40%, 13.50%, 13.60%, 13.70%, 13.80%, 13.90%, 14.00% tungsten; 0.00%, 0.10%, 0.20%, 0.30%, 0.40%, 0.50%, 0.60% yttrium; 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90% hafnium; and nickel and impurities as the remainder.

Due to the invention, the advantage results that the conventional scope of repair can be broadened, whereby large cracks can also be brazed. The braze can also be applied to places at which an intensive interaction with the base material is critical.

The invention also comprises enhancements, by way of which additional advantages result.

One enhancement of the invention provides that the alloy composition of the first braze alloy comprises the following mass percentage: between 0.00% and 0.1% yttrium. The first braze alloy, for example, can comprise 0.000%, 0.005%, 0.010%, 0.015%, 0.020%, 0.025%, 0.030%, 0.035%, 0.040%, 0.045%, 0.050% yttrium.

By mixing in yttrium, the advantage results that the wetting properties on potentially present oxides on crack flanks are improved.

One enhancement of the invention provides that the alloy composition of the second braze alloy comprises the following mass percentage: between 0.00% and 3.00% aluminum. The second braze alloy can comprise, for example, 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00% aluminum.

By mixing in aluminum, the advantage results that the oxidation properties are improved. By counteracting a reduction in the aluminum concentration from the first braze alloy by the second and third braze alloys during the dilution according to liquid-phase homogenization, small percentages of aluminum can be additionally alloyed in the second and/or third braze alloy.

One enhancement of the invention provides that the alloy composition of the second braze alloy comprises the following mass percentage: between 0.00% and 7.00% tungsten. The second braze alloy can comprise 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00%, 3.10%, 3.20%, 3.30%, 3.40%, 3.50%, 3.60%, 3.70%, 3.80%, 3.90%, 4.00%, 4.10%, 4.20%, 4.30%, 4.40%, 4.50%, 4.60%, 4.70%, 4.80%, 4.90%, 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00% tungsten.

By mixing in tungsten, the advantage results that the latter functions as a mixed crystal or solid solution hardening element, and in this way, the mechanical properties of the brazing material are optimized.

One enhancement of the invention provides that the alloy composition of the third braze alloy comprises the following mass percentage: between 0.00% and 3.00% aluminum. The third braze alloy can comprise, for example, 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00% aluminum.

By mixing in aluminum, the advantage results that the oxidation properties are improved. By counteracting a reduction in the aluminum concentration from the first braze alloy by the second and third braze alloys during the dilution according to liquid-phase homogenization, small percentages of aluminum can be additionally alloyed in the second and/or third braze alloy.

One enhancement of the invention provides that the alloy composition of the third braze alloy comprises the following mass percentage: between 0.00% and 5.70% tungsten. The third braze alloy can comprise, for example, 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00%, 3.10%, 3.20%, 3.30%, 3.40%, 3.50%, 3.60%, 3.70%, 3.80%, 3.90%, 4.00%, 4.10%, 4.20%, 4.30%, 4.40%, 4.50%, 4.60%, 4.70%, 4.80%, 4.90%, 5.00%, 5.10%, 5.20%, 5.30%, 5.40%, 5.50%, 5.60%, 5.70%, tungsten.

By mixing in tungsten, the advantage results that the latter functions as a mixed crystal or solid solution hardening element, and in this way, the mechanical properties of the brazing material are optimized.

One enhancement of the invention provides that the predetermined mixing ratio of the powders of the braze alloy mix comprises the following in mass percent: 15% first braze alloy; 25% second braze alloy; 25% third braze alloy; 35% additive alloy.

One enhancement of the invention provides that the predetermined mixing ratio of the powders of the braze alloy mix comprises the following in mass percent: 25% first braze alloy; 12.5% second braze alloy; 12.5% third braze alloy; 50% additive alloy.

One enhancement of the invention provides that the predetermined mixing ratio of the powders of the braze alloy mix comprises the following in mass percent: 50% first braze alloy; 10% second braze alloy; 10% third braze alloy; 30% additive alloy.

One enhancement of the invention provides that the predetermined mixing ratio of the powders of the braze alloy mix comprises the following in mass percent: 30% first braze alloy; 10% second braze alloy; 20% third braze alloy; 40% additive alloy.

One enhancement of the invention provides that the predetermined mixing ratio of the powders of the braze alloy mix comprises the following in mass percent: 30% first braze alloy; 20% second braze alloy; 10% third braze alloy; 40% additive alloy.

One enhancement of the invention provides that the predetermined mixing ratio of the powders of the braze alloy mix comprises the following in mass percent: 50% first braze alloy; 10% second braze alloy; 10% third braze alloy; 30% additive alloy.

A second aspect of the invention relates to an additive alloy for a braze alloy mix. An alloy composition of the additive alloy comprises the following in mass percent: between 0.00% and 10.00% cobalt; between 10.00% and 18.00% chromium; between 4.00% and 7.00% aluminum; between 4.00% and 7.00% tantalum; between 0.00% and 3.00% molybdenum; between 5.00% and 14.00% tungsten; between 0.00% and 0.6% yttrium; between 0.00% and 2.00% hafnium; and nickel as well as unavoidable impurities as the remainder. The additive alloy can comprise, for example 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00%, 3.10%, 3.20%, 3.30%, 3.40%, 3.50%, 3.60%, 3.70%, 3.80%, 3.90%, 4.00%, 4.10%, 4.20%, 4.30%, 4.40%, 4.50%, 4.60%, 4.70%, 4.80%, 4.90%, 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00%, 7.10%, 7.20%, 7.30%, 7.40%, 7.50%, 7.60%, 7.70%, 7.80%, 7.90%, 8.00%, 8.10%, 8.20%, 8.30%, 8.40%, 8.50%, 8.60%, 8.70%, 8.80%, 8.90%, 9.00%, 9.10%, 9.20%, 9.30%, 9.40%, 9.50%, 9.60%, 9.70%, 9.80%, 9.90%, 10.00% cobalt; 10.00%, 10.10%, 10.20%, 10.30%, 10.40%, 10.50%, 10.60%, 10.70%, 10.80%, 10.90%, 11.00%, 11.10%, 11.20%, 11.30%, 11.40%, 11.50%, 11.60%, 11.70%, 11.80%, 11.90%, 12.00%, 12.10%, 12.20%, 12.30%, 12.40%, 12.50%, 12.60%, 12.70%, 12.80%, 12.90%, 13.00%, 13.10%, 13.20%, 13.30%, 13.40%, 13.50%, 13.60%, 13.70%, 13.80%, 13.90%, 14.00%, 14.10%, 14.20%, 14.30%, 14.40%, 14.50%, 14.60%, 14.70%, 14.80%, 14.90%, 15.00%, 15.10%, 15.20%, 15.30%, 15.40%, 15.50%, 15.60%, 15.70%, 15.80%, 15.90%, 16.00%, 16.10%, 16.20%, 16.30%, 16.40%, 16.50%, 16.60%, 16.70%, 16.80%, 16.90%, 17.00%, 17.10%, 17.20%, 17.30%, 17.40%, 17.50%, 17.60%, 17.70%, 17.80%, 17.90%, 18.00% chromium; 4.00%, 4.10%, 4.20%, 4.30%, 4.40%, 4.50%, 4.60%, 4.70%, 4.80%, 4.90%, 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00% aluminum; 4.00%, 4.10%, 4.20%, 4.30%, 4.40%, 4.50%, 4.60%, 4.70%, 4.80%, 4.90%, 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00% tantalum; 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90%, 2.00%, 2.10%, 2.20%, 2.30%, 2.40%, 2.50%, 2.60%, 2.70%, 2.80%, 2.90%, 3.00% molybdenum; 5.00%, 5.10%, 5.20%, 5.30%, 5.40%, 5.50%, 5.60%, 5.70%, 5.80%, 5.90%, 6.00%, 6.10%, 6.20%, 6.30%, 6.40%, 6.50%, 6.60%, 6.70%, 6.80%, 6.90%, 7.00%, 7.10%, 7.20%, 7.30%, 7.40%, 7.50%, 7.60%, 7.70%, 7.80%, 7.90%, 8.00%, 8.10%, 8.20%, 8.30%, 8.40%, 8.50%, 8.60%, 8.70%, 8.80%, 8.90%, 9.00%, 9.10%, 9.20%, 9.30%, 9.40%, 9.50%, 9.60%, 9.70%, 9.80%, 9.90%, 10.00%, 10.10%, 10.20%, 10.30%, 10.40%, 10.50%, 10.60%, 10.70%, 10.80%, 10.90%, 11.00%, 11.10%, 11.20%, 11.30%, 11.40%, 11.50%, 11.60%, 11.70%, 11.80%, 11.90%, 12.00%, 12.10%, 12.20%, 12.30%, 12.40%, 12.50%, 12.60%, 12.70%, 12.80%, 12.90%, 13.00%, 13.10%, 13.20%, 13.30%, 13.40%, 13.50%, 13.60%, 13.70%, 13.80%, 13.90%, 14.00% tungsten; 0.00%, 0.10%, 0.20%, 0.30%, 0.40%, 0.50%, 0.60% yttrium; 0.00%, 0.10%, 0.20%, 0.30%, 0.40%, 0.50%, 0.60%, 0.70%, 0.80%, 0.90%, 1.00%, 1.10%, 1.20%, 1.30%, 1.40%, 1.50%, 1.60%, 1.70%, 1.80%, 1.90% hafnium; and nickel and impurities as the remainder.

A third aspect of the invention relates to a brazing method for brazing a component that has a nickel-based superalloy as base material. It is provided that the brazing method is carried out by means of the described braze alloy mix. The brazing method comprises at least the following steps.

In a first step, it is provided that the braze alloy mix is applied onto a site of the base material of the component that is to be brazed. It can be provided, for example, that the braze alloy mix is filled into a gap to be brazed, or, in general, into an opening in the component.

In a following step, it is provided to heat the braze alloy mix up to a brazing temperature. The brazing temperature in this case lies between 1150° C. and 1250° C., particularly at 1200° C. The brazing temperature can be 1150° C., 1160° C., 1170° C., 1180° C., 1190° C., 1200° C., 1210° C., 1220° C., 1230° C., 1240° C. or 1250° C. The brazing temperature lies above the liquidus temperature of the first braze alloy. The brazing temperature also lies within a melting range of the second braze alloy and within a melting range of the third braze alloy. The brazing temperature also lies below a solidus temperature of the additive alloy.

In a following step, it is provided to maintain the brazing temperature above a predetermined brazing time range between 10 minutes and 24 hours, particularly 30 minutes, in order to enable a liquid-phase homogenization of the first braze alloy, the second braze alloy, and the third braze alloy. The brazing time range can be, for example, 1.0 hour, 1.5 hour, 2.0 hours, 2.5 hours, 3.0 hours, 3.5 hours, 4.0 hours, 4.5 hours, 5.0 hours, 5.5 hours, 6.0 hours, 6.5 hours, 7.0 hours, 7.5 hours, 8.0 hours, 8.5 hours, 9.0 hours, 9.5 hours, 10.0 hours, 10.5 hours, 11.0 hours, 11.5 hours, 12.0 hours, 12.5 hours, 13.0 hours, 13.5 hours, 14.0 hours, 14.5 hours, 15.0 hours, 15.5 hours, 16.0 hours, 16.5 hours, 17.0 hours, 17.5 hours, 18.0 hours, 18.5 hours, 19.0 hours, 19.5 hours, 20.0 hours, 20.5 hours, 21.0 hours, 21.5 hours, 22.0 hours, 22.5 hours, 23.0 hours, 23.5 hours, 24.0 hours.

In a following step, after the liquid-phase homogenization over the predetermined brazing time range, it is provided to reduce the temperature to a post-treatment temperature, which lies between 1150° C. and 1180° C. The post-treatment temperature can be 1150° C., 1155° C., 1160° C., 1165° C., 1170° C., 1175° C. or 1180° C.

The post-treatment temperature is maintained over a predetermined post-treatment time between 1 and 24 hours, particularly between 3 and 11 hours, in order to enable an isothermal solidification of the braze alloy mix. The post-treatment time can be, for example, 1.0 hours, 1.5 hours, 2.0 hours, 2.5 hours, 3.0 hours, 3.5 hours, 4.0 hours, 4.5 hours, 5.0 hours, 5.5 hours, 6.0 hours, 6.5 hours, 7.0 hours, 7.5 hours, 8.0 hours, 8.5 hours, 9.0 hours, 9.5 hours, 10.0 hours, 10.5 hours, 11.0 hours, 11.5 hours, 12.0 hours, 12.5 hours, 13.0 hours, 13.5 hours, 14.0 hours, 14.5 hours, 15.0 hours, 15.5 hours, 16.0 hours, 16.5 hours, 17.0 hours, 17.5 hours, 18.0 hours, 18.5 hours, 19.0 hours, 19.5 hours, 20.0 hours, 20.5 hours, 21.0 hours, 21.5 hours, 22.0 hours, 22.5 hours, 23.0 hours, 23.5 hours, 24.0 hours.

It can be provided that the braze alloy mix containing a binder and/or a flux mixed in is applied onto the site of the component to be brazed. In other words, it is provided that the flux is added, so as to apply the braze alloy mix as a paste onto the site to be brazed.

Additional features and the advantages thereof are derived from the descriptions of the first and second aspects of the invention.

A fourth aspect of the invention relates to a component for a turbomachine. The component has a nickel-based superalloy as a base material. It is provided that the component was brazed by means of a braze alloy mix according to the first aspect of the invention and/or an additive alloy according to the second aspect of the invention in a brazing method.

Additional features and the advantages thereof are derived from the descriptions of the first, second, and third aspects of the invention.

BRIEF DESCRIPTION OF THE DRAWING FIGURES

Additional features of the invention result from the claims, the figures, and the description of the figures. The features and combinations of features named above in the description, as well as the features and combinations of features named in the description of the figures and/or in the figures shown alone below can be used not only in the combination indicated in each case, but also in other combinations, without departing from the scope of the invention. Thus, embodiments that are not explicitly shown and explained in the figures, but proceed from the explained embodiments and can be produced by separate combination of features, are also to be viewed as comprised and disclosed by the invention. Embodiments and combination of features that thus do not have all features of an originally formulated independent claim are also to be viewed as disclosed. Moreover, embodiments and combination of features that depart from the combination of features presented in references back to the claims or deviate from these are to be viewed as disclosed particularly by the embodiments presented above. Herein:

DESCRIPTION OF THE INVENTION

Figure 1:
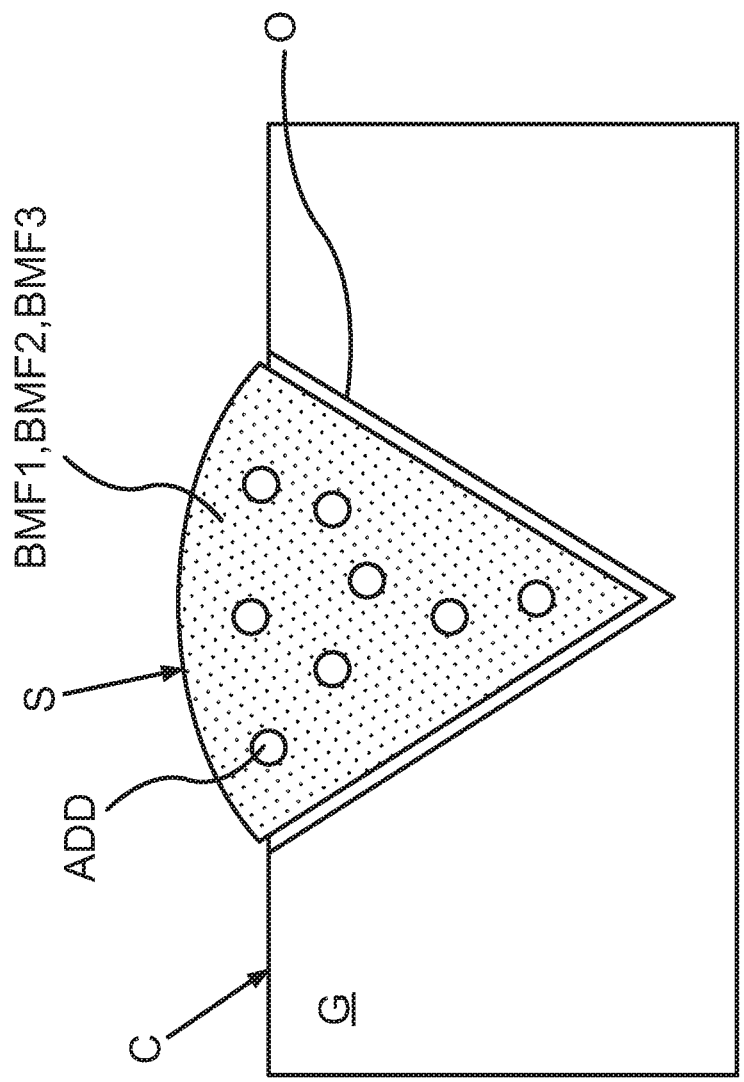
FIG. 1 shows a schematic representation of a component for a turbomachine.

FIG. 1 shows a schematic representation of a component C for a turbomachine. The component C can have a nickel-based superalloy as a base material G. Due to material fatigue, a crack can form in the component C, and said crack can be filled by means of a brazing method. The opening O can be filled with a braze alloy mix S in the brazing method. The braze alloy mix S can be present as a powder of a first braze alloy BFM1, a powder of a second braze alloy BFM2, and a powder of a third braze alloy BFM3. The braze alloys can differ from one another in their composition and comprise melting point reducers. The braze alloys can therefore differ from one another in their melt range. The melt range of the first braze alloy BFM1 can lie within the range of 1050° C. to 1160° C. The melt range of the second braze alloy BFM2 as well as the third braze alloy BFM3 can lie within the range of 1180° C. to 1230° C. The second braze alloy BFM2 and the third braze alloy BFM3 can be present in a eutectic or near-eutectic phase, so that a liquidus temperature T and a solidus temperature T of these braze alloys can lie together at one melting point. Based on different melt ranges of braze alloys, it may be possible in this case to melt the braze alloys sequentially. An additive alloy ADD can be mixed with the braze alloy mix S. The additive alloy ADD can be provided for the purpose of taking up at least one of the melting point reducers of the braze alloys during a manufacturing method. The additive alloy ADD can have a higher melt range than the braze alloys. The melt range of the additive alloy ADD can lie within the range of 1300° C. to 1500° C. For this purpose, the additive alloy ADD can be designed as a diffusion sink. The extent of the melting point reducers diffusing into the base material G can be reduced in this way.

Figure 2:
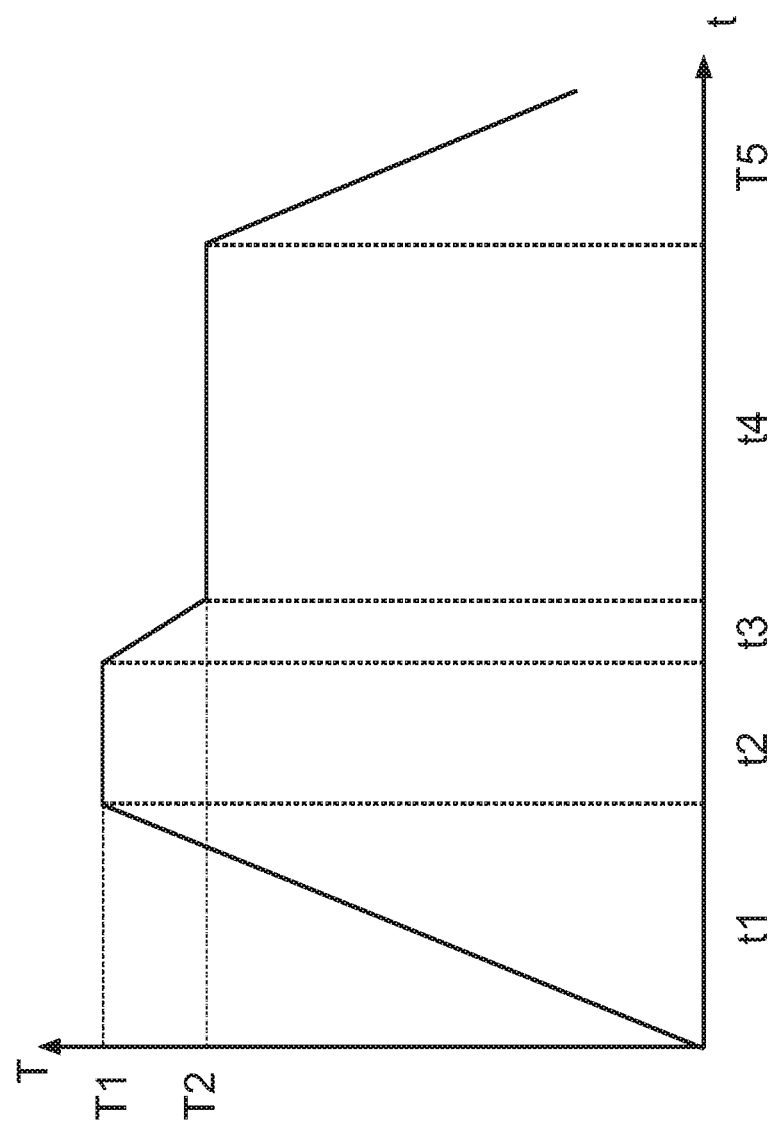
FIG. 2 shows a schematic representation of a method for brazing a component.

FIG. 2 shows a schematic representation of a method for brazing a component C. In order to prevent brittle phases and in order to be able to make possible the reproducibility of the braze alloy mix S also in repeated repairs, a novel braze concept with four newly developed braze alloys was developed. The new braze alloy mix S is hereby characterized in that it can solidify isothermally independently of the brazing gap width; an isothermal solidification of the braze alloy mix S is primarily possible due to the interaction between the braze alloys. The new braze alloy mix S comprises three different braze alloys BFM1, BFM2, BFM3, and an additive alloy ADD of a high-melting component. The braze alloys BFM1, BFM2, BFM3 are also designated as braze filler metals, BFM.

The braze alloy mix S can be applied together with a flux and/or a binder into a site of the component C that is to be brazed, for example a crack or an opening O. The braze alloy mix S can be present as powder and can comprise a powder of a first braze alloy BFM1, a powder of a second braze alloy BFM2, a powder of a third braze alloy BFM3, and a powder of an additive alloy ADD. Exemplary alloy compositions are shown in Table 1, wherein the mass percents are indicated, also known as wt. %.

TABLE 1

| Element | BFM1 | BFM2 | BFM3 | Additive |
|---|---|---|---|---|
| Nickel | remainder | | remainder | remainder |
| Cobalt | 5-15 | remainder | 0-10 | 0-10 |
| Chromium | 8-16 | 15-25 | 18-30 | 10-18 |
| Aluminum | 1-4.5 | 0-3 | 0-3 | 4-7 |
| Titanium | | 8.5-13 | 10-14.5 | |
| Tantalum | max. 4 | | | 4-7 |
| Niobium | | 0-5 | 0-1.8 | |
| Molybdenum | | | | 0-3 |
| Tungsten | | 0-7 | 0-5.7 | 5-14 |
| Germanium | max. 10 | | | |
| Boron | 1-3 | | | |
| Yttrium | 0 to 0.1 | | | max. 0.6 |
| Hafnium | max. 4 | | | max. 2 |

(Data in mass%)

Yttrium need not absolutely be contained in BFM1. Yttrium only improves the wetting properties with respect to potentially present oxides on crack flanks. Tungsten functions as a mixed crystal or solid solution hardening element and optimizes the mechanical properties of the brazing material. The brazing strategy would work also without tungsten in BFM2 or BFM3. However, tungsten is required in the additive. Aluminum improves the oxidation properties. In order to counteract a reduction of the Al concentration from BFM1 by BFM2/BFM3 (dilution after liquid-phase homogenization), small percentages can be additionally alloyed in BFM2/BFM3. The brazing strategy here would work also without aluminum in BFM2 or BFM3.

The alloys BFM1, BFM2, BFM3, ADD can be mixed in the form of powder in precisely defined mixing ratios and applied onto the site to be repaired. The braze alloy mix S can additionally be mixed with the flux and/or the binder in order to introduce it as a paste.

The braze alloy mix can comprise the powder of the first braze alloy BFM1, the powder of the second braze alloy BFM2, the powder of the third braze alloy BFM3, and the powder of the additive alloy ADD in a predetermined mixing ratio. Possible mixing ratios are disclosed, for example, in Table 2.

The additive alloy ADD can also be mixed with conventional braze alloys from the prior art. The additive alloy ADD reduces the percentage of eutectic brittle phases due to a larger uptake capacity, whereby a higher boride precipitation potential is meant, when compared to other additive alloys according to the prior art. The mechanical properties in the region of the brazing site can be improved thereby.

TABLE 2

| BFM1 | BFM2 | BFM3 | ADD |
|---|---|---|---|
| 15 | 25 | 25 | 35 |
| 25 | 12.5 | 12.5 | 50 |

TABLE 2-continued

| BFM1 | BFM2 | BFM3 | ADD |
|---|---|---|---|
| 50 | 10 | 10 | 30 |
| 30 | 10 | 20 | 40 |
| 30 | 20 | 10 | 40 |
| 50 | 10 | 10 | 30 |

(Data in mass %)

The new brazing concept provides for reducing the primary and rapidly diffusing melting point reducer boron by alternative melting point reducers. At the same time, the alternative melting point reducers should not display any negative microstructural properties. Boron and titanium can form new phases with one another in an alloy, for example, τ-phase er TiB2, whereby the melting point is raised. A high melting point leads to poor flow properties of the braze. For this reason, the melting point reducers were divided into functional clusters and mixed in different alloys.

The first braze alloy BFM1 contains boron and has a lower melting point in comparison to the second braze alloy BFM2 and the third braze alloy BFM3. The first braze alloy BFM1 therefore has good flow properties.

The second braze alloy BFM2 and the third braze alloy BFM3 do not contain boron. The primary melting point reducers are thereby niobium and titanium. Since niobium and titanium usually act only slightly in a melting point reducing manner, the material matrix was effectively adjusted, so that titanium and niobium have strong melting point reducing properties.

The additive alloy ADD has a higher melting point than BFM1, BFM2, BFM3 and the additive alloy. The melting point is higher than the processing temperature/brazing temperature T1, so that the additive does not melt. Also, the alloy chemistry of the additive alloy ADD was effectively optimized, so that it has a high solubility for the most rapidly diffusing melting point reducer, boron.

The second braze alloy BFM2 and the third braze alloy BFM3 are braze alloys in which the matrix was optimized with respect to reducing the temperature, and depended on the melting point reducer used. Therefore, only elements are used that are also found in nickel-based superalloys. The matrix compositions differ considerably between the second braze alloy BFM2 and the third braze alloy BFM3.

After applying the braze alloy mix S, proceeding from room temperature over a warm-up time of t1 up to a brazing temperature T1 of 1150° C. to 1250° C., particularly about 1200° C., the braze alloy mix S can be heated over a predetermined heating time. It can be provided that the braze alloys differ from one another in their melt range. The melt range of the first braze alloy BFM1 for example, can lie within the range of 1050° C. to 1160° C. and thus below the melt range of the second braze alloy BFM2 and the third braze alloy BFM3 between 1180° C. and 1230° C. Based on the different melt ranges of the braze alloys, a sequential melting of the braze alloys can take place. For example, first a solidus temperature T of the first braze alloy BFM1 can be exceeded, so that the first braze alloy BFM1 first begins to melt. During a further warm-up, a liquidus temperature T of the first braze alloy BFM1 can be exceeded, so that the first braze alloy BFM1 can be completely melted. The brazing temperature T1 can lie, for example, within the melt range of the second braze alloy BFM2 as well as within the melt range of the third braze alloy BFM3. In a further warm-up, the temperature T can exceed the solidus temperature T of the second braze alloy BFM2 as well as the third braze alloy BFM3, so that the second braze alloy BFM2 and the third braze alloy BFM3 also begin to melt. If the brazing temperature T1 lies above the liquidus temperature T of the second braze alloy BFM2 as well as of the third braze alloy BFM3, these also melt completely. The brazing temperature T1 can be selected so that it lies below a solidus temperature T of the additive alloy ADD. The additive alloy ADD is thus not melted at the brazing temperature T1. The melt range of the additive alloy ADD can lie within the range of 1300° C. to 1500° C.

The brazing temperature T1 can be maintained for a predetermined brazing time range t2 from 10 minutes up to a maximum 24 hours, usually for 30 minutes. In this way, it is possible that a liquid-phase homogenization of the first braze alloy BFM1, the second braze alloy BFM2, and the third braze alloy BFM3 takes place. During the brazing time t2, in addition to the liquid-phase homogenization of the braze alloys, a controlled diffusion of boron from the melt of the braze alloys into the additive alloy ADD can occur.

Due to the sequential melting of the brazes, the interaction between the first braze alloy BFM1, the second braze alloy BFM2, as well as the third braze alloy BFM3 should be controlled. Since the second braze alloy BFM2 and the third braze alloy BFM3 have higher melting points, the brazing temperature T1 can be raised to above the liquidus temperature of the first braze alloy BFM1, which brings about good flow properties. After the melting ranges of the second braze alloy BFM2 and of the third braze alloy BFM3 have been reached, the braze alloys are mixed by liquid-phase homogenization. The melting point reducers are thereby diluted into one another. The concentration of boron in the new melt is strongly reduced in comparison to the concentration in the first braze alloy BFM1.

Due to the simultaneous increase in solubility in the additive, the boron can be withdrawn from the melt via diffusion processes. The mixtures between the first braze alloy BFM1, the second braze alloy BFM2, and the third braze alloy BFM3 are indicated in a defined mixing ratio, so that the final alloy chemistry has a γ'-precipitation-hardened brazing material zone. The aluminum and germanium from the first braze alloy BFM1 thereby form the γ'-phase with the titanium and niobium from the second (BFM2) and the third braze alloy (BFM3). The high cobalt concentration from the second braze alloy BFM2 reduces the γ'-solvus temperature, in order to secondarily precipitate the γ'-phase despite a high concentration of γ'-forming elements, and to be able to act to increase strength.

After the brazing time t2, the temperature T of the braze alloy mix S from the brazing temperature T1 to a post-treatment temperature T2 can be reduced over a predetermined intermediate time t3. The post-treatment temperature T2 can lie, for example, between 1150° C. and 1180° C. The post-treatment temperature T2, for example, can lie below the γ'-solvus temperature T of the base material G of the component C, whereby any microstructural damage of the base material G can be avoided.

The post-treatment temperature T2 can be maintained over a predetermined post-treatment time t4, for example, over 1 hour to 24 hours, in particular 3 to 11 hours, in order to make possible an isothermal solidification of the braze alloy mix S. The goal is that the final brazing microstructure in the isothermal solidification arises from a melt that is alloyed within the brazing process and can therefore combine competing targeted properties by using different braze alloys.

The additive was newly developed with respect to a clearly higher solubility for the most rapidly diffusing melting point reducer, boron. If the boron concentration is reduced first by homogenization with the second braze alloy BFM2 and the third braze alloy BFM3, the braze alloy mix S should be controlled by the diffusion of the melting point reducer into particles of the additive alloy ADD. Since the boron concentration in the braze alloy mix S and the boron solubility of the additive alloy ADD were increased, the braze alloy mix S can solidify isothermally without interaction with the base material G. This means, in particular, without diffusion of boron into the base material G. The additive can also be used in combination with already existing braze alloys containing boron. The optimizing property, which is to prevent brittle phases, also reduces said phases in that case, but brittle phases cannot be completely prevented, since the boron concentration is too high in known braze alloys. The term solubility in the present case means the concentration-dependent phase transition of boron at the solidus line at process-relevant temperatures. The uptake capacity for B in the additive was increased. For such increase, a new phase formation is necessary, since the solubility of boron in nickel is negligibly small.

After the post-treatment time t4, the heating of the braze alloy mix S can be terminated, so that the temperature T can decrease over a cooling time from the post-treatment temperature T2 to room temperature T.

What is claimed is:

1. A braze alloy mix for application in a method for brazing a component that has a nickel-based superalloy as base material, wherein
the braze alloy mix comprises the following powder in a predetermined mixing ratio: a powder of a first braze alloy, a powder of a second braze alloy, a powder of a third braze alloy, and a powder of an additive alloy, wherein
an alloy composition of the first braze alloy comprises the following in mass percent:
between 5.00% and 15.00% cobalt;
between 8.00% and 16.00% chromium;
between 1.00% and 4.50% aluminum;
between 0.00% and 4.50% tantalum;
between 0.00% and 10.0% germanium;
between 1.00% and 3.00% boron;
between 0.00% and 4.00% hafnium;
and
nickel as well as unavoidable impurities as the remainder;
an alloy composition of the second braze alloy comprises the following in mass percent:
between 15.00% and 25.00% chromium;
between 8.50% and 13.00% titanium;
between 0.00% and 5.00% niobium; and
cobalt as well as unavoidable impurities as the remainder;
an alloy composition of the third braze alloy comprises the following in mass percent:
between 0.00% and 10.00% cobalt;
between 18.00% and 30.00% chromium;
between 10,00% and 14.50% titanium;
between 0.00% and 1.80% niobium; and
nickel as well as unavoidable impurities as the remainder;
an alloy composition of the additive alloy comprises the following in mass percent:
between 0.00% and 10.00% cobalt;
between 10.00% and 18.00% chromium;
between 4.00% and 7,00% aluminum;
between 4.00% and 7.00% tantalum;
between 0.00% and 3.00% molybdenum;

between 5.00% and 14.00% tungsten;
between 0.00% and 0.60% yttrium;
between 0.00% and 2.00% hafnium; and
nickel as well as unavoidable impurities as the remainder.

2. The braze alloy mix according to claim 1, wherein the alloy composition of the first braze alloy comprises the following in mass percent:
between 0.00% and 0.05% yttrium.

3. The braze alloy mix according to claim 1, wherein the alloy composition of the second braze alloy (BFM2) comprises the following in mass percent:
between 0.00% and 3.00% aluminum.

4. The braze alloy mix according to claim 1, wherein the alloy composition of the second braze alloy comprises the following in mass percent:
between 0.00% and 7.00% tungsten.

5. The braze alloy mix according to claim 1, wherein the alloy composition of the third braze alloy (BFM3) comprises the following in mass percent:
between 0.00% and 3.00% aluminum.

6. The braze alloy mix according to claim 1, wherein the alloy composition of the third braze alloy comprises the following in mass percent:
between 0.00% and 5.70% tungsten.

7. The braze alloy mix according to claim 1, wherein the predetermined mixing ratio of the powders of the braze alloy mix comprises the following in mass percent:
15% first braze alloy;
25% second braze alloy;
25% third braze alloy; and
35% additive alloy.

8. The braze alloy mix according to claim 1 wherein the predetermined mixing ratio of the powders of the braze alloy mix comprises the following in mass percent:
25% first braze alloy;
12.5% second braze alloy;
12.5% third braze alloy; and
50% additive alloy.

9. The braze alloy mix according to claim 1, wherein the predetermined mixing ratio of the powders of the braze alloy mix comprises the following in mass percent:
50% first braze alloy;
10% second braze alloy;
10% third braze alloy; and
30% additive alloy.

10. The braze alloy mix according to claim 1, wherein the predetermined mixing ratio of the powders of the braze alloy mix comprises the following in mass percent:
30% first braze alloy;
10% second braze alloy;
20% third braze alloy; and
40% additive alloy.

11. The braze alloy mix according to claim 1, wherein the predetermined mixing ratio of the powders of the braze alloy mix comprises the following in mass percent:
30% first braze alloy;
20% second braze alloy;
10% third braze alloy; and
40% additive alloy.

12. The braze alloy mix according to claim 1, wherein the predetermined mixing ratio of the powders of the braze alloy mix comprises the following in mass percent:
50% first braze alloy;
10% second braze alloy;
10% third braze alloy; and
30% additive alloy.

* * * * *